United States Patent [19]

Hohlfeld et al.

[11] Patent Number: 4,627,107

[45] Date of Patent: Dec. 2, 1986

[54] RADIO COMMUNICATIONS SYSTEM INCLUDING VEHICLE MOUNTED AND HAND-HELD RADIO DEVICES

[75] Inventors: Rainer Hohlfeld; Ralph Schwerin, both of Berlin; Hans Kader, Hennef; Andreas Heymann, Essen, all of Fed. Rep. of Germany

[73] Assignee: Robert Bosch GmbH, Stuttgart, Fed. Rep. of Germany

[21] Appl. No.: 281,496

[22] Filed: Jul. 6, 1981

Related U.S. Application Data

[63] Continuation of Ser. No. 195,086, Oct. 8, 1980, abandoned, which is a continuation of Ser. No. 11,164, Feb. 8, 1979, abandoned.

[30] Foreign Application Priority Data

Feb. 9, 1978 [DE] Fed. Rep. of Germany ....... 2805420

[51] Int. Cl.[4] .......................... H04B 7/15; H04B 1/40

[52] U.S. Cl. ........................................ 455/11; 455/89; 455/90; 455/99; 455/346

[58] Field of Search ....................... 455/11, 73, 74, 79, 455/88-90, 95, 99, 345, 346

[56] References Cited

U.S. PATENT DOCUMENTS

| | | | |
|---|---|---|---|
| 3,059,184 | 10/1962 | Germain | 455/90 |
| 3,071,728 | 1/1963 | Grace et al. | 455/336 |
| 3,550,001 | 12/1970 | Hanley | 455/345 |
| 3,699,443 | 10/1972 | Weger | 455/89 |
| 3,955,140 | 5/1976 | Stephens et al. | 455/89 |
| 4,107,611 | 8/1978 | Holcomb et al. | 455/95 |
| 4,162,449 | 7/1979 | Bouyssounouse et al. | 455/79 |

OTHER PUBLICATIONS

"Comco Model 812 Portacom Publication on All Solid-State Mobile/Portable Transceiver", 1/29/74.

Publication by Sonab on "Cassette Mobile Radios MRU08 and MRU16", 6/19/75.

*Primary Examiner*—Jin F. Ng

*Attorney, Agent, or Firm*—Spencer & Frank

[57] ABSTRACT

A radio system providing two-way radio communications between a mobile radio transmitting and receiving station operating in a first frequency range and a stationary radio transmitting and receiving station operating in a second frequency range via a radio broadcasting device disposed in a motor vehicle. The broadcasting device includes a motor vehicle mounted radio transmitting and receiving station as well as a motor vehicle mount which is essentially provided with holding and connecting means for at least two hand-held radio communications devices operating in the first frequency range, a current supply circuit connected with the motor vehicle battery and a function transfer device. One hand-held communications device can be used as such a mobile radio transmitting and receiving station outside the motor vehicle. Radio communication takes place, in the first frequency range, from the hand-held communications device used outside the motor vehicle via the other hand-held device which is in its mount in the motor vehicle and, in the second frequency range, from the other hand-held device via the function transfer device and the motor vehicle mounted radio transmitting and receiving station to the stationary radio transmitting and receiving station and in the opposite direction, in the second frequency range, from the stationary station via the motor vehicle mounted station and the function transfer device to the other hand-held device and, in the first frequency range, from the other hand-held device to the one hand-held device.

11 Claims, 2 Drawing Figures

RADIO COMMUNICATIONS SYSTEM INCLUDING VEHICLE MOUNTED AND HAND-HELD RADIO DEVICES

CROSS-REFERENCE TO RELATED APPLICATION

This application is a continuation of application Ser. No. 195,086, filed Oct. 8, 1980, now abandoned, itself a continuation of application Ser. No. 011,164, filed Feb. 8, 1979 now abandoned.

BACKGROUND OF THE INVENTION

The present invention relates to a radio system of the type including a radio broadcasting device disposed in a motor vehicle for establishing two-way radio communication between a mobile radio transmitting and receiving station and a stationary radio transmitting and receiving station.

It is known to effect radio comunications between mobile radio stations via a stationary radio relay station, as described, for example, by Werner Giese in the text *Funksprechen* [Radio Voice Communication], published by Berliner Union, Stuttgart, 1971, at pages 65 and 66. In this case either the simplex or duplex mode is employed. In the prior art it was not possible, however, to communicate directly or via a radio relay station between a hand-held two-way communications device which operates, for example, in the 2 m-band and a radio station which operates in another frequency range, for example the 4 m-band.

SUMMARY OF THE INVENTION

It is an object of the present invention to provide the possibility for such communication.

Another object of the invention is to permit such communication in a system offering a high degree of operating flexibility.

These and other objects are achieved, according to the invention, in a radio system including a radio broadcasting device disposed in a motor vehicle for establishing two-way radio communication between a mobile radio transmitting and receiving station operating in a first frequency range and a stationary radio transmitting and receiving station operating in a second frequency range, by constituting the broadcasting device of a vehicle mounted radio transmitting and receiving station operating in the second frequency range, a mount disposed in the vehicle for holding at least two portable communications devices, electrical connection means associated with the mount for establishing signal conducting connections with a device held in the mount, a power supply circuit connected to receive power from a source in the vehicle and to the connection means, and function transfer means connecting the connection means to the vehicle mounted station, by providing the system with at least a first portable two-way communications device, constituting one such mobile station, configured to fit in the mount and provided with contacts connectable to the connection means when the device is held in the mount.

One advantage of the radio system according to the invention is that it makes possible radio communications of the RS2 type between one hand-held two-way communications device operating in a first frequency range and a stationary radio station operating in a second frequency range via another hand-held, two-way communications device and the motor vehicle radio transmitting and receiving station which also operates in the second frequency range. The RS2 mode operation is described in the book of F. W. Rosemeier "Handbuch über den UKW-Sprechfunk bei den Sicherheitsdiensten", Carl Heymanns Verlag, MÜnchen, 1971, p. 39 to 41.

Radio communication can also take place in the first frequency range between the one hand-held device, or communicator, when it is outside the motor vehicle and the other hand-held device disposed in the motor vehicle. Finally radio communication can take place in the second frequency range between the motor vehicle transmitting and receiving station and the stationary radio station.

The basic radio system according to the invention can be subjected to advantageous modifications and improvements to be described below.

It is of particular advantage if the motor vehicle mount is designed for two hand-held communicators, with each hand-held communicator being accommodated in a respective chamber in the motor vehicle mount and these chambers being separated from one another by a further chamber which accommodates the major portion of the circuit elements for the motor vehicle mount.

DESCRIPTION OF THE PREFERRED EMBODIMENTS

Figure 1:
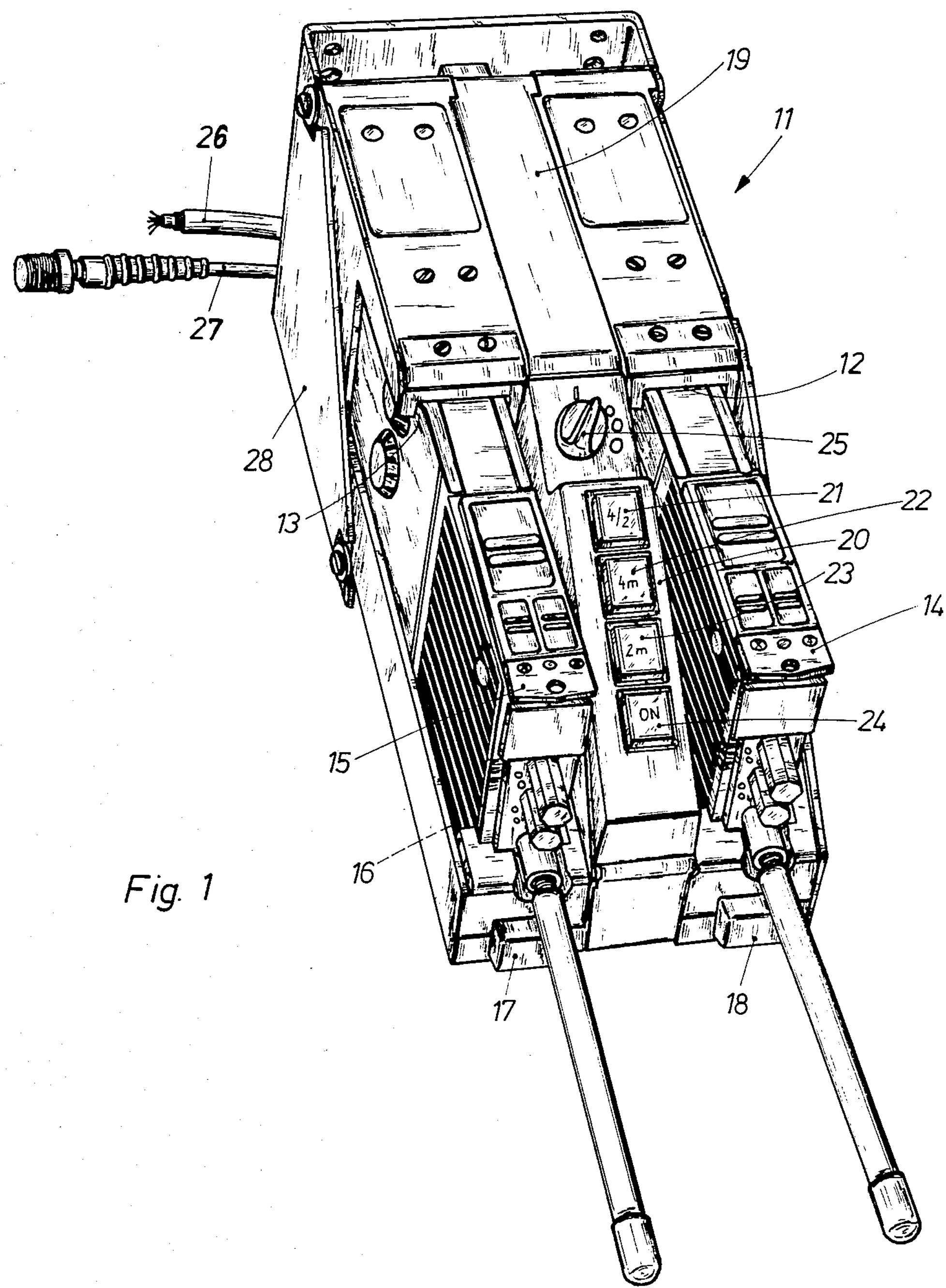
FIG. 1 is a perspective view of one preferred embodiment of a motor vehicle mount for a radio communications system according to the invention.

The motor vehicle mount 11 shown in FIG. 1 presents two chambers 12 and 13 each accommodating an approximately block-shaped hand-held, two-way communications device 14, 15. The hand-held devices can be pushed into the chambers from the front and in their inserted state are automatically locked in place. In the inserted and locked state, contact elements disposed at the lower frontal face of each hand-held device 14, 15 and corresponding countercontact elements in each of chambers 12, 13 are in engagement with one another. The location of the contact elements and of the countercontact elements is designated in FIG. 1 by the broken line 16.

Unlocking buttons 17 and 18 are provided at the frontal face of the motor vehicle mount 11 for unlocking each of the inserted hand-held devices 14 and 15.

A further chamber 19 is disposed between the two chambers 12 and 13 of the motor vehicle mount 11 for accommodating the major portion of the circuit elements of the motor vehicle mount. Of these components FIG. 1 shows only the operating elements of one switch unit 20 including four push buttons 21, 22, 23 and 24 and a combined volume control and on-off switch 25. A multiconductor connecting wire 26 and an antenna cable 27 extend from the rear of the mount 11. Connecting wire 26 connects the motor vehicle mount, inter alia, in a manner to be explained below, with the motor vehicle battery and with a motor vehicle transmitting and receiving station. The antenna wire 27 is connected to an antenna of the vehicle.

The motor vehicle mount 11 is releasably fastened in an approximately U-shaped carrier bar 28 arranged to be fixed to the interior wall of the motor vehicle, preferably below the dashboard.

The circuitry and operation of the electrical portion of the radio communication system 10 will be explained with reference to the simplified block circuit diagram of FIG. 2.

Figure 2:
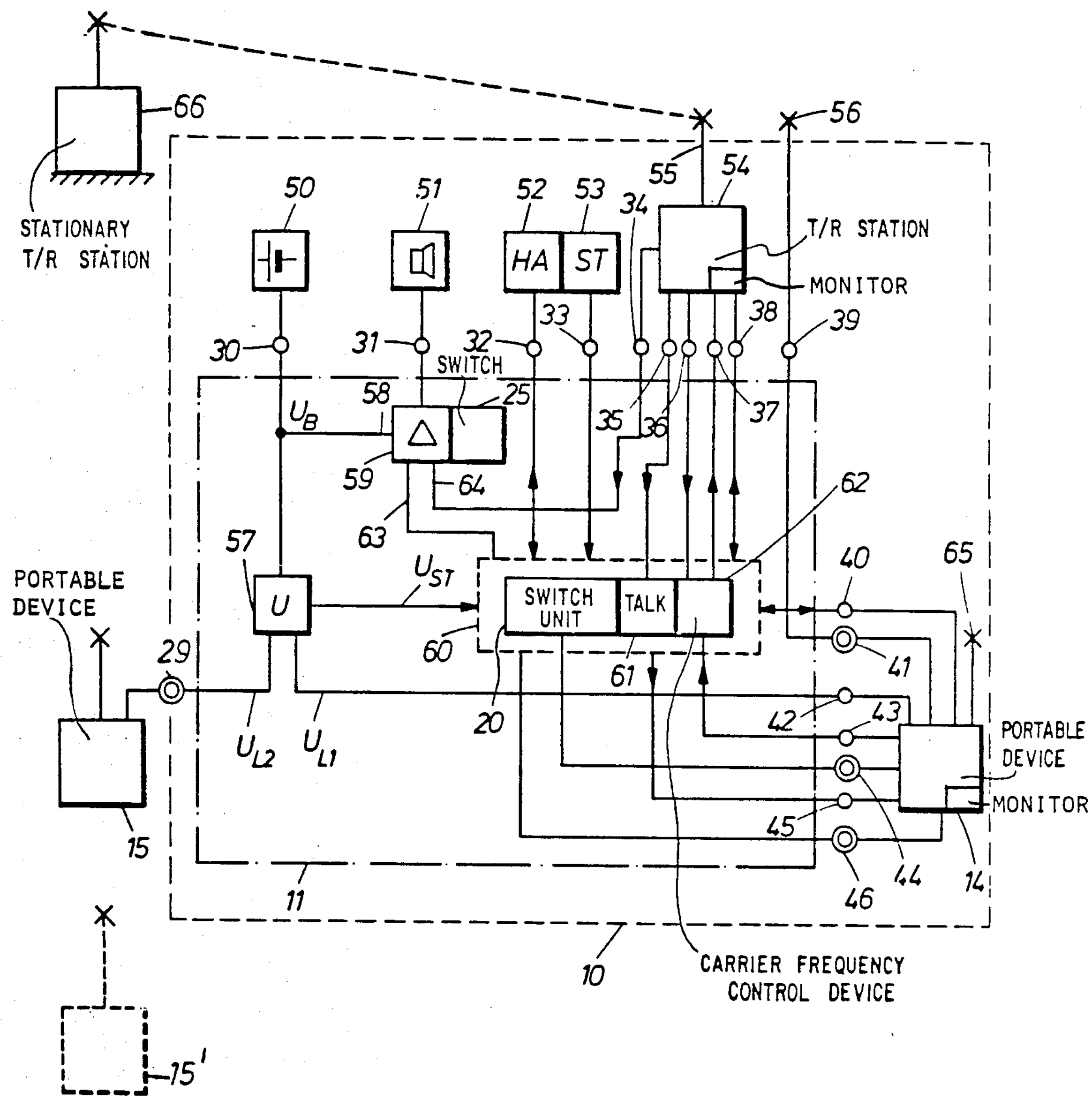
FIG. 2 is a simplified block circuit diagram of one preferred embodiment of the radio communications system according to the invention.

In FIG. 2 the circuit portion enclosed by dot-dash lines is housed in the motor vehicle mount 11, while the portion 10 enclosed by broken lines is located in the vehicle and constitutes the motor vehicle communication system. The mount itself is provided with a number of terminals 29 through 46 of which the first terminal 29 is connected to the signal input/output line of the one hand-held device 15, the second terminal 30 is connected to the motor vehicle battery 50, the third terminal 31 is connected to an external loudspeaker 51, and the fourth and fifth terminals 32 and 33 are connected to a hand-held, two-way transducer device 52 which contains an electroacoustic transducer and includes a transmitting key or button 53.

The sixth through tenth terminals 34, 35, 36, 37 and 38 lead to a motor vehicle mounted radio transmitting and receiving station 54 which is permanently installed in the motor vehicle. The motor vehicle radio transmitting and receiving station 54 is connected with a radio transmitting and receiving antenna 55 fastened to the motor vehicle chassis. The eleventh terminal 39 of the motor vehicle mount 11 is connected to a second radio transmitting and receiving antenna 56.

The terminals 40, 41, 42, 43, 44, 45 and 46 are brought to the other hand-held device 14 and are designed in the form of plug-in connections.

The motor vehicle battery 50 is connected to supply, via the second terminal 30, battery voltage $U_B$ to one input of a short-circuit-proof voltage supply circuit 57 and to a current supply terminal 58 of an audio frequency amplifier 59 which includes the combined volume control and on-off switch 25. The supply circuit 57 furnishes two direct voltages $U_{L1}$ and $U_{L2}$.

The voltage $U_{L1}$ travels via terminal 42 to the hand-held device 14 inserted in the motor vehicle mount 11 and serves to provide operating power or to charge or recharge the battery disposed in this hand-held device. In an analogous manner, and for the same purpose, the charging voltage $U_{L2}$ travels via the first terminal 29 to the hand-held device 15.

The current supply circuit 57 additionally furnishes a stabilizing direct voltage $U_{St}$ which serves to supply current to a function transfer device 60 and, via terminal 44, to the hand-held device 14. The function transfer device 60, to be described below, is in communication, via terminal 32, with the hand-held device 52; via terminal 33, with the transmitting button 53; via terminals 35 to 38, with the motor vehicle transmitting and receiving station 54; and via terminals 40 and 43 to 46, with the hand-held device 14.

The function transfer device 60 includes the switch unit 20, a talk switch 61, and a carrier control device 62.

The amplifier 59 has two signal inputs 63 and 64, input 63 being connected, via the function transfer device 60 and the terminal 46, with hand-held device 14 and input 64 being connected, via terminal 34, with the motor vehicle transmitting and receiving station 54.

The above-described radio transmitting device performs the following functions.

When the hand-held device 14 is inserted and locked into chamber 12, connections are completed at terminals 40–46 and the following switching actions are performed automatically:

(a) the built-in radio transmitting and receiving antenna 65 for the device is switched off and, in its place, a connection is established with the second radio transmitting and receiving antenna 56 of the vehicle;

(b) the device 14 is no longer powered by its own NiCd battery, but by vehicle battery 50 via terminal 30, supply circuit 57 and terminals 42 and 44; and (c) the internal listen/talk electroacoustic transducer of hand-held device 14 is switched off and the hand set 52 and/or the external loudspeaker 51 are connected to the audio frequency electronic circuitry of device 14.

After inserting and locking in the hand-held device 15, its NiCd battery is charged from the motor vehicle battery 50 without at the same time making the device operational.

The switches required for switching on the two hand-held devices 14 and 15 are represented in FIG. 2 by the terminals 29, 41, 44 and 46 which are identified by two circles.

While the hand-held devices 14 and 15 are designed for operation in a first frequency range, for example the 2 m-band, the motor vehicle radio transmitting and receiving station 54 operates in a second frequency range, preferably the 4 m-band. The motor vehicle radio transmitting and receiving station 54 communicates with a stationary radio transmitting and receiving station 66 which is equipped for radio traffic in the first and the second frequency range.

The following uses are possible for the present radio system:

1. Radio Relay Operation (a) Radio communication from the hand-held communications device 15 via the radio communication system 10 to the stationary station 66.

To achieve this, the user depresses the button 24 on the switching unit 20, shown in FIG. 1, and thus switches on the current supply for the motor vehicle mount 11. He also depresses button 21 which switches the radio system 10 to 4 m-band/2 m-band relay operation. Then, by depressing the unlocking button 17, the user can remove the second hand-held communications device 15 from the motor vehicle mount 11 and leave the motor vehicle, carrying device 15 with him. Device 15 then functions as a hand-held, two-way radio and is in the state 15' shown in FIG. 2 The hand-held devices 14 and 15 are then switched to the same intercom channel.

If now the hand-held device 15' transmits in the 2 m-band, this transmission is received via antenna 56 by the hand-held device 14 disposed in the motor-vehicle mount 11. The hand-held device 14 includes, in the usual manner, a monitor which emits a certain indication upon the receipt of the assigned carrier frequency so as to turn on the transmitting part of the motor vehicle radio receiving and transmitting station 54, this being effected via terminal 43, carrier frequency control device 62 and terminal 37. The carrier modulation of the hand-held device 15' is transmitted in the 2 m-band to the hand-held device 14 and from there, via terminals 40 and 38 and the motor vehicle transmitting and receiving station 54, in the 4 m-band to the stationary radio transmitting and receiving station 66.

(b) Radio communication from the stationary radio transmitting and receiving station 66 to hand-held device 15.

The modulated carrier transmitted from the stationary radio transmitting and receiving station 66 actuates a monitor included in the motor vehicle radio transmitting and receiving station 54 to cause it to emit an indication via terminal 36 to the carrier frequency control device 62 when the carrier frequency is being received. The demodulated voice signals, or audio frequency signals, from the motor vehicle radio transmitting and receiving station 54 constitute the criterion for the activation of the talk switch 61. Only when both devices 61 and 62 have received an indication will a further indication be generated which keys up the transmitting portion of the hand-held device 14 via terminal 45. The modulation, or information, of the stationary radio transmitting and receiving station 66 is then transmitted in the 2 m-band by the hand-held device 14 to the hand-held device 15' disposed outside the motor vehicle. The modulation can also be monitored by means of hand set 52, via terminal 46, function transfer device 60 and terminal 32.

2. Operation in the 2 m-band 2.1 Here buttons 23 and 24 must both be depressed. This switches the radio communication system to the 2 m-band and switches off both the talk switch 61 and the carrier frequency control device 62 because the motor vehicle radio transmitting and receiving station 54 is not needed. The user removes the hand-held device 15 from the motor vehicle mount 11 and can communicate in both directions on the 2 m-band from outside the motor vehicle with the hand-held device 14 disposed in the motor vehicle mount.

2.2 With this variation, the radio communication takes place in the first frequency range from the hand-held device 14 disposed in the motor vehicle to the stationary radio transmitting and receiving station 66 and vice versa via the radio transmitting device 10 without using the motor vehicle radio transmitting and receiving station 54 and without use of the talk switch 61 and the carrier frequency control device 62.

3. Operation in the 4 m-band

In this case, the user must depress buttons 24 and 22, which also switches off the talk switch 61 and the carrier frequency control device 62. The radio communication then takes place on the 4 m-band between the motor vehicle radio transmitting and receiving station 54 and the stationary radio transmitting and receiving station 66. The hand-held devices 14 and 15 are retained in the motor vehicle mount 11 and are automatically recharged from the motor vehicle battery 50.

Only in 2 m-operation is the modulation signal of the hand-held device 15', as received by the hand-held device 14, made audible via amplifier 59 in the external loudspeaker 51, the volume of which is adjustable continuously or in stages by means of the combined volume control and on/off switch 25.

The hand-held communications devices 14 and 15 are both of the same type. Such a device is shown for instance in the book of F. W. Rosemeier, "Handbuch über den UKW-Sprechfunk bei den Sicherheitsdiensten", Carl Heymanns Verlag, München, 1971, p. 85 and 86. The hand-held device 52 (handset) provided with a transmitting button 53 (key) is shown on page 84 of the same book. The motor vehicle transmitting and receiving station 54 is, for instance, of a type as shown and described on pages 83 to 85 of the forementioned book. The current supply circuit 57 is of a type as shown in the U.S Pat. No. 2,832,900. An example of the talk switch 61 is shown and described in the broshure VKD TM-Nt 422 of BOSCH, Germany, published on June 12, 1977.

The electrical contacts 16 provided between mount 11 and hand-held devices 14 and 15 respectively may be of the type as shown in the U.S. Pat. No. 4,038,505.

An antenna, which can be used for two transceivers operating in different frequency ranges are known by the U.S. Pat. No. 4,041,498.

It will be understood that the above description of the present invention is susceptible to various modifications, changes and adaptations, and the same are intended to be comprehended within the meaning and range of equivalents of the appended claims.

What is claimed is:

1. In a radio system including a first hand-held two-way communications device operating in a first frequency range, and a radio broadcasting device disposed in a motor vehicle for establishing two-way radio communication between the first hand-held device and a stationary radio transmitting and receiving station operating in a second frequency range, the radio broadcasting device including a vehicle mounted radio transmitting and receiving station operating in the second frequency range, a mount disposed in the vehicle and configured for holding the first hand-held device, and a power supply circuit connected to receive power from a source in the vehicle, the improvement wherein:

said system further comprises a second hand-held, two-way communications device operating in the first frequency range;

said mount is further configured for holding said second hand-held device;

each said hand-held device is provided with external contacts; and said radio broadcasting device further comprises: electrical connection means associated with said mount and connected to said power supply circuit for establishing readily-disconnectable connections with said external contacts of, and for supplying power from said power supply circuit to, each said hand-held device when that hand-held device is held in said mount; and function transfer means disposed in said mount and connecting said electrical connection means to said vehicle mounted station.

2. A system as defined in claim 1 wherein radio communication takes place in the first frequency range from said first communications device located out of said mount and outside the motor vehicle via said second communications device held in said mount, and, in the second frequency range, from said second communications device via said function transfer means and said vehicle mounted station to the stationary station, and takes place in the reverse direction, in the second frequency range, from the stationary station via said vehicle mounted station and said function transfer means to said second communications device and, in the first frequency range, from said second communications device to said first communications device.

3. A system as defined in claim 2 wherein radio communications in both directions between said first communications device disposed outside the motor vehicle and said second communications device disposed in said mount takes place in the first frequency range under control of said function transfer device.

4. A system as defined in claim 2 wherein: said vehicle mounted station includes a signal reception monitor; said function transfer means comprise a switching unit, a talk switch and a carrier frequency control device, said talk switch being connected at its input to said monitor of said vehicle mounted station and at its output to one said communications device in such a manner that upon receipt by said vehicle mounted station of a voice or audio modulated carrier, the transmitting component of said second communications device is keyed up; and said second communications device also comprises a monitor connected to said vehicle mounted station in such a manner that if the carrier is received by said second communications device the transmitting portion of said vehicle mounted station is keyed up.

5. A system as defined in claim 2 wherein said mount is additionally provided with connecting means for at least one of an external loudspeaker disposed in the motor vehicle, a hand-held microphone having a talk button and connectable with said vehicle mounted station, and a second radio transmitting and receiving antenna which can be connected with said second communications device.

6. A system as defined in claim 2 wherein said mount comprises two chambers each arranged to hold a respective communications device, and a further chamber disposed between said two chambers and accommodating a portion of the circuit components of said system.

7. A system as defined in claim 6 wherein said connection means comprise contacts located in each of said chambers arranged to hold one said communications device, and said external contacts of said first communications device are located to establish electrical connections with said contacts of said connection means when said first communications device is inserted into a respective chamber.

8. A system as defined in claim 6 wherein said mount comprises an amplifier for amplifying audio frequency signals to be reproduced by an external loudspeaker, said amplifier being provided with a combined volume control and on/off switch, said function transfer means comprises a switching unit provided with an actuating element, and said amplifier switch and said actuating element are located at an exterior surface of said further chamber.

9. A system as defined in claim 2 further comprising an antenna mounted on the vehicle, constructed to operate in both the first and second frequency ranges, and connected in signal conducting communication with said vehicle mounted station and said second communications device.

10. A system as defined in claim 1 further comprising a first transmitting and receiving antenna mounted on the vehicle and wherein radio communication in both directions between said vehicle mounted station and said stationary station takes place under control of said function transfer device in the second frequency range via said first antenna.

11. A system as defined in claim 1 wherein said mount comprises an amplifier for amplifying audio frequency signals to be reproduced by an external loudspeaker.

* * * * *